US012610438B2

(12) United States Patent
Liu et al.

(10) Patent No.: US 12,610,438 B2
(45) Date of Patent: Apr. 21, 2026

(54) ADAPTIVE VOLTAGE MODULATION CIRCUIT

(71) Applicant: ANPEC ELECTRONICS CORPORATION, Hsinchu (TW)

(72) Inventors: Yun-Li Liu, Hsinchu (TW); Ruei-Hung Chiou, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 51 days.

(21) Appl. No.: 18/952,069

(22) Filed: Nov. 19, 2024

(65) Prior Publication Data

US 2026/0052610 A1 Feb. 19, 2026

(30) Foreign Application Priority Data

Aug. 13, 2024 (TW) ................................ 113130237

(51) Int. Cl.
*H05B 45/30* (2020.01)

(52) U.S. Cl.
CPC .................................. *H05B 45/30* (2020.01)

(58) Field of Classification Search
CPC ..................................................... H05B 45/30
See application file for complete search history.

(56) References Cited

U.S. PATENT DOCUMENTS 6,541,933 B1 * 4/2003 Leggate ................. H02P 27/08 318/599
8,749,163 B2 * 6/2014 Phadke ................. H05B 45/50 315/307
10,158,299 B1 * 12/2018 Wei ......................... H02M 1/12
10,909,911 B1 * 2/2021 Zheng ...................... G09G 3/32
11,276,345 B2 * 3/2022 Wei ......................... G10L 25/51
11,436,970 B2 * 9/2022 Gray .................... G09G 3/2088
12,057,080 B2 * 8/2024 Wong .................. G09G 3/3216
12,369,240 B2 * 7/2025 Peng ...................... H05B 45/34
12,444,343 B2 * 10/2025 Wong ...................... G09G 3/36
12,494,158 B2 * 12/2025 Yeh ......................... G09G 3/32
2016/0172965 A1 * 6/2016 Suryanarayana ... H02M 3/1588 323/234

(Continued)

FOREIGN PATENT DOCUMENTS

CN 115348699 A * 11/2022 ............ H05B 45/46
EP 4475630 A1 * 12/2024 ............ H05B 45/44

(Continued)

*Primary Examiner* — Adam D Houston
(74) *Attorney, Agent, or Firm* — Li & Cai Intellectual Property (USA) Office

(57) ABSTRACT

An adaptive voltage modulation circuit is provided. The adaptive voltage modulation circuit includes a plurality of driver circuits and a voltage control circuit. A first one of the driver circuits outputs a feedback signal to a next one of the driver circuits according to data of a load connected thereto. Each of the driver circuits, except for the first one and a last one of the driver circuits, according to the data of the load connected thereto and the feedback signal from a previous one of the driver circuits, outputs a next feedback signal to a next one of the driver circuits. The last one of the driver circuits, according to the data of the load connected thereto and the feedback signal from a previous one of the driver circuits, instructs the voltage control circuit to supply a common modulation power signal to each of the loads.

20 Claims, 5 Drawing Sheets

(56) References Cited

U.S. PATENT DOCUMENTS

| | | | | |
|---|---|---|---|---|
| 2017/0256303 | A1* | 9/2017 | Yu | H04L 25/0278 |
| 2018/0184491 | A1* | 6/2018 | Walters | B60Q 11/005 |
| 2019/0387588 | A1* | 12/2019 | Greenwood | H05B 45/46 |
| 2020/0205254 | A1* | 6/2020 | Fultz | H05B 45/10 |
| 2021/0120642 | A1* | 4/2021 | Zhang | H05B 45/30 |
| 2021/0366391 | A1* | 11/2021 | Wei | G01J 1/44 |
| 2022/0020310 | A1* | 1/2022 | Gray | G09G 3/32 |
| 2025/0007750 | A1* | 1/2025 | Liu | H04L 61/5038 |
| 2025/0324499 | A1* | 10/2025 | Peng | H05B 45/34 |
| 2025/0324502 | A1* | 10/2025 | Fujino | H05B 47/23 |
| 2025/0330034 | A1* | 10/2025 | Lu | H02J 7/62 |

FOREIGN PATENT DOCUMENTS

| | | | | |
|---|---|---|---|---|
| WO | WO-2025019045 | A1 * | 1/2025 | H02M 3/04 |
| WO | WO-2025114046 | A1 * | 6/2025 | H02M 7/4835 |

* cited by examiner

ADAPTIVE VOLTAGE MODULATION CIRCUIT

CROSS-REFERENCE TO RELATED PATENT APPLICATION

This application claims the benefit of priority to Taiwan Patent Application No. 113130237, filed on Aug. 13, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a voltage modulation circuit, and more particularly to an adaptive voltage modulation circuit.

BACKGROUND OF THE DISCLOSURE

In people's daily life, light-emitting components such as light-emitting diodes (LED) are widely applied in various products such as traffic lights, taillights, headlights, street lights, computer indicators, flashlights, backlights of display devices, and so on.

In some applications, a plurality of light strings are disposed in a light-emitting circuit, and each of the plurality of light strings includes the light-emitting components such as the light-emitting diodes (LED) that are connected with each other in series. The plurality of light strings are detected and driven respectively by a plurality of driver circuits, and a single power supply circuit supplies common power to the plurality of light strings.

When the common power received by the plurality of light strings is insufficient for operation of one or more of the plurality of light strings, the single power supply circuit additionally supplies more common power to the plurality of light strings. However, an amount of the common power often exceeds what is required for one or more of the plurality of light strings or is less than that required by one or more of the plurality of light strings. As a result, it is possible that not all of the light strings emit light as desired, and the light-emitting components that only withstand low voltages may be damaged due to overheating.

SUMMARY OF THE DISCLOSURE

In response to the above-referenced technical inadequacies, the present disclosure provides an adaptive voltage modulation circuit including a plurality of driver circuits and a voltage controlling circuit. The driver circuits are arranged and connected with each other in series. The driver circuits are respectively connected to a plurality of loads. The voltage controlling circuit is connected to the plurality of driver circuits and the plurality of loads. A first one of the plurality of driver circuits, according to data of the load connected thereto, outputs one of a plurality of feedback signals to a next one of the plurality of driver circuits. Each of the plurality of driver circuits, except for the first one and a last one of the plurality of driver circuits, according to the data of the load connected thereto and a previous one of the plurality of feedback signals from a previous one of the plurality of driver circuits, outputs a next one of the plurality of feedback signals to a next one of the plurality of driver circuits. The last one of the plurality of driver circuits, according to the data of the load connected thereto and the feedback signal from a previous one of the plurality of driver circuits, outputs a power supply instructing signal. The voltage controlling circuit, according to the power supply instructing signal, sets a common modulation power signal and outputs the common modulation power signal to each of the plurality of loads.

In order to solve the above-mentioned problems, one of the technical aspects adopted by the present disclosure is to provide an adaptive voltage modulation circuit including a plurality of driver circuits and a main control circuit. The driver circuits are arranged and connected with each other in series. The driver circuits are respectively connected to a plurality of loads. The main control circuit is connected to the plurality of driver circuits and the plurality of loads. A first one of the plurality of driver circuits, according to data of the load connected thereto, outputs one of a plurality of feedback signals to a next one of the plurality of driver circuits. Each of the plurality of driver circuits, except for the first one and a last one of the plurality of driver circuits, according to the data of the load connected thereto and a previous one of the plurality of feedback signals from a previous one of the plurality of driver circuits, outputs a next one of the plurality of feedback signals to a next one of the plurality of driver circuits. The last one of the plurality of driver circuits, according to the data of the load connected thereto and the feedback signal from a previous one of the plurality of driver circuits, outputs a power supply instructing signal. The main control circuit outputs a main control signal to the first one of the plurality of driver circuits. Each of the plurality of driver circuits, except for the last one of the plurality of driver circuits, transmits the main control signal from the previous one of the plurality of driver circuits to the next one of the plurality of driver circuits. The main control circuit, according to the power supply instructing signal, outputs a common modulation power signal to each of the plurality of loads.

As described above, the present disclosure provides the adaptive voltage modulation circuit. In the adaptive voltage modulation circuit of the present disclosure, each of the plurality of driver circuits except for the last one of the plurality of driver circuits outputs the feedback signal to the next one of the plurality of driver circuits according to the data (including a voltage) of the load (such as a light string) connected thereto. In particular, the last one of the plurality of driver circuits instructs the voltage controlling circuit to supply an appropriate amount of power to the plurality of loads, according to the data of the load connected thereto and the data of others of the plurality of loads driven by other ones of the plurality of driver circuits from the previous one of the plurality of driver circuits. Therefore, the adaptive voltage modulation circuit of the present disclosure is capable of supplying an optimal amount of power to the plurality of loads.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
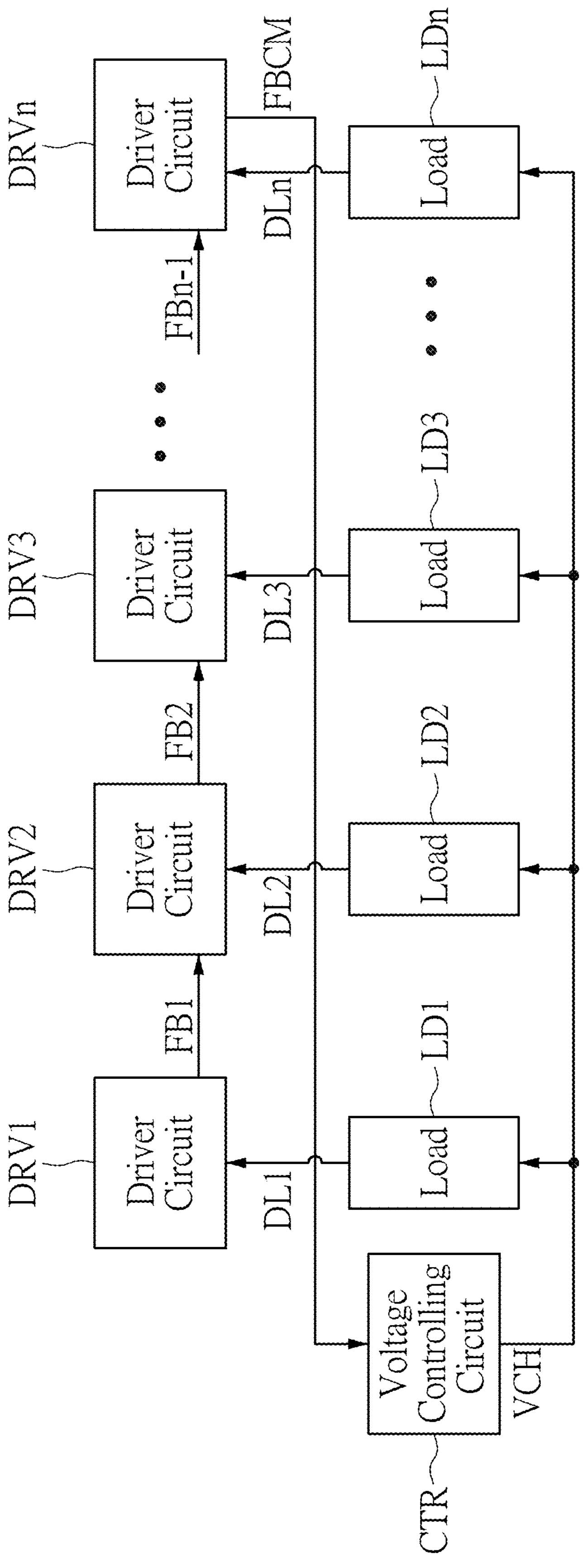
FIG. 1 is a block diagram of an adaptive voltage modulation circuit according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of an adaptive voltage modulation circuit according to a first embodiment of the present disclosure.

As shown in FIG. 1, in the first embodiment, the adaptive voltage modulation circuit of the present disclosure includes a plurality of driver circuits DRV1 to DRVn and a voltage controlling circuit CTR.

The plurality of driver circuits DRV1 to DRVn are arranged and connected with each other in series. The number and an order of the plurality of driver circuits DRV1 to DRVn may be determined according to actual requirements, but the present disclosure is not limited thereto.

Each of the plurality of driver circuits DRV1 to DRVn may have a signal output terminal. Each of the plurality of driver circuits DRV1 to DRVn except for the driver circuit DRV1 that is a first one of the plurality of driver circuits DRV1 to DRVn may have a signal input terminal. The signal input terminal of each of the driver circuits DRV2 to DRVn is connected to a signal output terminal of a previous one of the plurality of driver circuits DRV1 to DRVn. For example, the signal input terminal of the driver circuit DRV2 that is a second one of the plurality of driver circuits DRV1 to DRVn is connected to the signal output terminal of the driver circuit DRV1. The signal input terminal of the driver circuit DRV3 that is a third one of the plurality of driver circuits DRV1 to DRVn is connected to the signal output terminal of the driver circuit DRV2.

Each of the plurality of driver circuits DRV1 to DRVn may further have a driving output terminal. The driving output terminals of the plurality of driver circuits DRV1 to DRVn are respectively connected to (a plurality of driving terminals or control terminals of) a plurality of loads LD1 to LDn.

It is worth noting that, only the driver circuit DRV**1*n* that is a last one of the plurality of driver circuits DRV1 to DRVn is connected to a signal input terminal of the voltage controlling circuit CTR. A power output terminal of the voltage controlling circuit CTR is connected to the plurality of loads LD1 to LDn. For example, the power output terminal of the voltage controlling circuit CTR is connected to a plurality of first terminals or power input terminals respectively of the plurality of loads LD1 to LDn, or a common node of the plurality of loads LD1** to LDn.

The driver circuit DRV1 that is the first one of the plurality of driver circuits DRV1 to DRVn, according to data DL1 of the load LD1 connected thereto, outputs a feedback signal FB1 to the driver circuit DRV2 arranged next to the driver circuit DRV1.

The plurality of driver circuits DRV1 to DRVn, except for the driver circuit DRV1 and the driver circuit DRV**1*n*, respectively output a plurality of feedback signals FB2 to FBn-1 to the next ones of the plurality of driver circuits DRV3 to DRVn that are respectively arranged next to the driver circuits DRV2 to DRVn-1, according to data DL2 to DLn-1 of the loads LD2 to LDn-1 connected thereto and the feedback signals FB1 to FBn-2 from the previous ones of the plurality of driver circuits DRV1 to DRVn-2. The driver circuit DRV1*n* is arranged next to the driver circuit DRVn-1**.

That is, the driver circuit DRV2 outputs the feedback signal FB2 to the driver circuit DRV3 that is arranged next to the driver circuit DRV2 according to the data DL2 of the load DL2 connected thereto and the feedback signal FB1 from the driver circuit DRV1. The driver circuit DRV2 is arranged next to the driver circuit DRV1. The driver circuit DRV3 outputs the feedback signal FB3 to the driver circuit DRV4 that is arranged next to the driver circuit DRV3 according to the data DL3 of the load DL3 connected thereto and the feedback signal FB2 from the driver circuit DRV2.

The plurality of driver circuits DRV1 to DRVn may respectively set or obtain a plurality of reference data, and may respectively compare the plurality of data DL1 to DLn of the plurality of loads LD1 to LDn with the plurality of reference data to respectively generate a plurality of comparison results. For example, each of the plurality of data DL1 to DLn of the plurality of loads LD1 to LDn may include a voltage, and each of the plurality of reference data may include a voltage threshold, but the present disclosure is not limited thereto.

The driver circuit DRV1 that is the first one of the plurality of driver circuits DRV1 to DRVn may output the feedback signal FB1 to the driver circuit DRV2 arranged next to the driver circuit DRV1 according to the comparison result.

The plurality of driver circuits DRV1 to DRVn, except for the driver circuits DRV1, DRVn, may respectively output feedback signals FB2 to FBn-1 to the next ones of the plurality of driver circuits DRV3 to DRVn according to the comparison results and the feedback signals FB1 to FBn-2 from the previous ones of the plurality of driver circuits DRV1 to DRVn-2. For example, the driver circuit DRV2 outputs the feedback signal FB2 to the driver circuit DRV3 that is arranged next to the driver circuit DRV2 according to the comparison result generated by the driver circuit DRV2 and the feedback signal FB1 from the driver circuit DRV1.

It is worth noting that, only the signal output terminal of the driver circuit DRVn that is the last one of the plurality of driver circuits DRV1 to DRVn is connected to the signal input terminal of the voltage controlling circuit CTR, and others of the plurality of driver circuits DRV1 to DRVn are not connected to the voltage controlling circuit CTR. Furthermore, the power output terminal of the voltage controlling circuit CT of the adaptive voltage modulation circuit of the present disclosure is connected to the plurality of loads LD1 to LDn.

It is worth noting that, only the driver circuit DRVn that is the last one of the plurality of driver circuits DRV1 to DRVn outputs a power supply instructing signal FBCM according to the data DLn of the load LDn connected thereto and the feedback signal FBn-1 from the driver circuit DRVn-1. The driver circuit DRVn is arranged next to the driver circuit DRVn-1.

The feedback signal FBn-1 that is received from the driver circuit DRVn-1 by the driver circuit DRVn includes the plurality of data DL1 to DLn-1 respectively of the plurality of loads LD1 to LDn-1 (or the plurality of comparison results of the plurality of data DL1 to DLn and the plurality of reference data).

That is, the driver circuit DRVn that is the last one of the plurality of driver circuits DRV1 to DRVn, according to the plurality of data DL1 to DLn respectively of the plurality of loads LD1 to LDn, evaluates a common modulation power (that is a common modulation voltage) which is commonly required for the plurality of data DL1 to DLn to output the power supply instructing signal FBCM.

For example, the driver circuit DRVn may, according to the data DLn of the load LDn and the feedback signal FB1-1 from the driver circuit DRVn-1, count the number of the loads whose the data (that is the voltage) is larger than the reference data (including the voltage threshold) among the plurality of data DL1 to DLn respectively of the plurality of loads LD1 to LDn as a count value to output the power supply instructing signal FBCM.

When the driver circuit DRVn determines that any one of the plurality of data DL1 to DLn (that are the voltages) respectively of the plurality of loads LD1 to LDn is not larger than the reference data (including the voltage threshold), the driver circuit DRVn does not count the count value and maintains the count value.

Conversely, when the driver circuit DRVn determines that any one of the plurality of data DL1 to DLn (that are the voltages) respectively of the plurality of loads LD1 to LDn is larger than the reference data (including the voltage threshold), the driver circuit DRVn counts up the count value for increasing the count value. That is, the driver circuit DRVn adds a value such as "1" to the count value. The number of times that the count value is counted up depends on how many of the loads have the data being larger than the reference data.

The driver circuit DRVn that is the last one of the plurality of driver circuits DRV1 to DRVn may output the power supply instructing signal FBCM according to the count value that is counted finally.

The voltage controlling circuit CTR may set a common modulation power signal VCH according to the power supply instructing signal FBCM from the driver circuit DRVn, and output the common modulation power signal VCH to each of the plurality of loads LD1 to LDn. The common modulation power signal VCH described herein may include a voltage signal as a common modulation voltage signal.

For example, the voltage controlling circuit CTR may store a plurality of reference count values and a plurality of reference common modulation power (such as reference common modulation voltages) on a lookup table. The plurality of reference common modulation power respectively correspond to the plurality of reference count values. The voltage controlling circuit CTR may look up, from the lookup table, the reference common modulation power that corresponds to the reference count value being equal to the count value instructed by the power supply instructing signal FBCM. The voltage controlling circuit CTR may output the common modulation power signal VCH to each of the plurality of loads LD1 to LDn according to the reference common modulation power that is looked up.

After each of the plurality of loads LD1 to LDn receives the common modulation power signal VCH from the voltage controlling circuit CTR, a voltage of each of the plurality of loads LD1 to LDn is adjusted to a target voltage value. As a result, differences between the voltages respectively of the plurality of loads LD1 to LDn are reduced, thereby preventing temperatures of the plurality of loads LD1 to LDn from increasing to cause damage to the plurality of loads LD1 to LDn.

Figure 2:
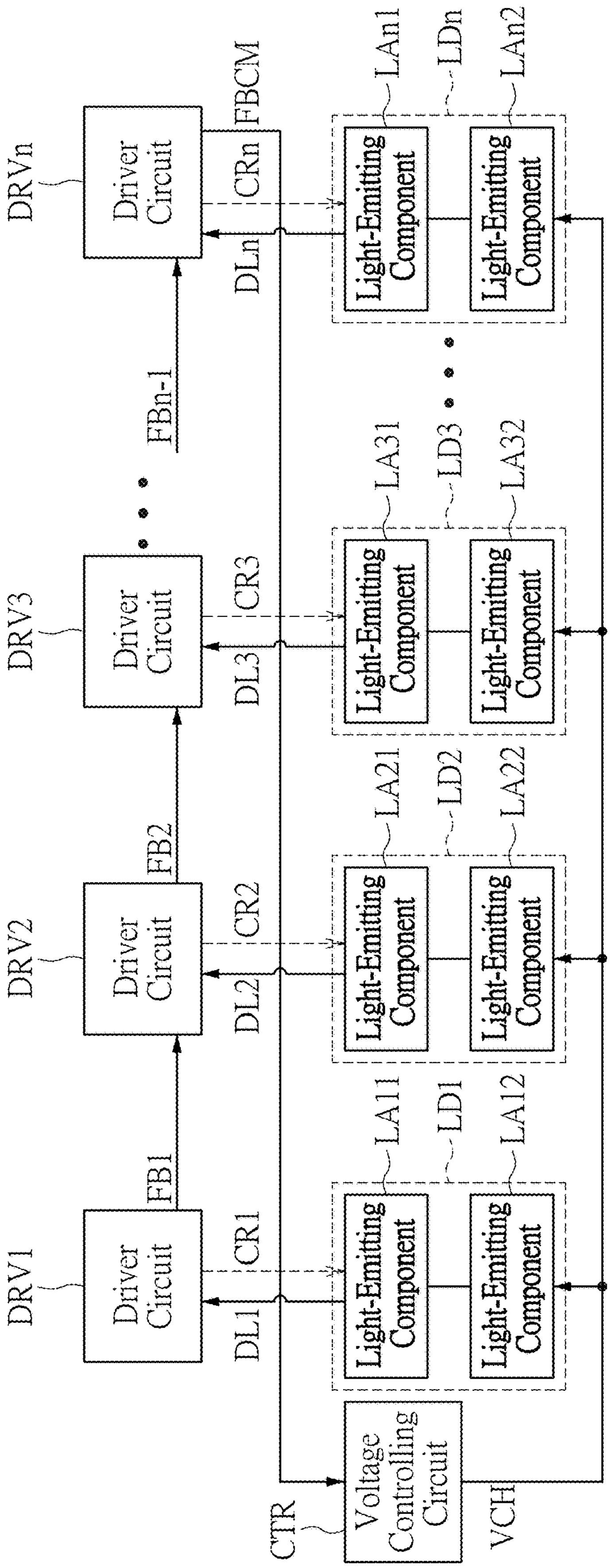
FIG. 2 is a block diagram of an adaptive voltage modulation circuit according to a second embodiment of the present disclosure.

Reference is made to FIG. 2, which is a block diagram of an adaptive voltage modulation circuit according to a second embodiment of the present disclosure.

As shown in FIG. 2, in the second embodiment, the adaptive voltage modulation circuit of the present disclosure includes the plurality of driver circuits DRV1 to DRVn and the voltage controlling circuit CTR.

The descriptions of the second embodiment of the present disclosure that are the same as the descriptions of the first embodiment of the present disclosure are not repeated herein. Differences between the second and first embodiments are described in detail as follows.

As shown in FIG. 2, in the second embodiment, each of the plurality of loads LD1 to LDn may include two light-emitting components such as light-emitting diodes, the load LD1 includes light-emitting components LA11, LA12, the load LD2 includes light-emitting components LA21, LA22, the load LD3 includes light-emitting components LA31, LA32, and the load LDn includes light-emitting components LAn1, LAn2. In practice, the number of light-emitting components included in each of the plurality of loads LD1 to LDn may be determined according to actual requirements, and the light-emitting components included in each or any one of the plurality of loads LD1 to LDn may be replaced with other circuit components, but the present disclosure is not limited thereto. Each of the plurality of loads LD1 to LDn shown in FIG. 1 may include one or more circuit components such as light-emitting components.

The driver circuit DRVn that is the last one of the plurality of driver circuits DRV1 to DRVn may, according to the data DL1 to DLn of the plurality of loads LD1 to LDn, determine amounts of a plurality of modulation power that are respectively required for each of the plurality of loads LD1 to LDn. For example, the driver circuit DRVn may select one of the plurality of modulation powers as a minimum common modulation power (such as a minimum common modulation voltage) to output the power supply instructing signal FBCM to each of the plurality of loads LD1 to LDn.

After the power supply instructing signal FBCM is outputted to each of the plurality of loads LD1 to LDn, the plurality of loads LD1 to LDn may reach a desired state, or may not reach the desired state due to various different materials composed of the plurality of loads LD1 to LDn, the number and configurations of the plurality of loads LD1 to LDn, and other factors. When one or more of the plurality of loads LD1 to LDn does not reach the desired state, the one or more of the plurality of loads LD1 to LDn need to be modulated, which is described in detail as follows.

After the power supply instructing signal FBCM is outputted to each of the plurality of loads LD1 to LDn, one or more of the plurality of driver circuits DRV1 to DRVn may supply one or more of individual modulation signals CR1 to CRn to one or more of the plurality of loads LD1 to LDn according to the data DL1 to DLn of the plurality of loads LD1 to LDn connected thereto.

For example, after the plurality of data LD1 to LDn of the plurality of loads LD1 to LDn are changed by the power supply instructing signal FBCM, the driver circuit DRV1 supplies the individual modulation signal to the load LD1 according to the changed data DL1 of the load LD1 such that an operation state of the load LD1 (such as brightness of light emitted by the load LD1) reaches the desired state. The individual modulation signal described herein may include a current signal as an individual modulation current signal.

Figure 3:
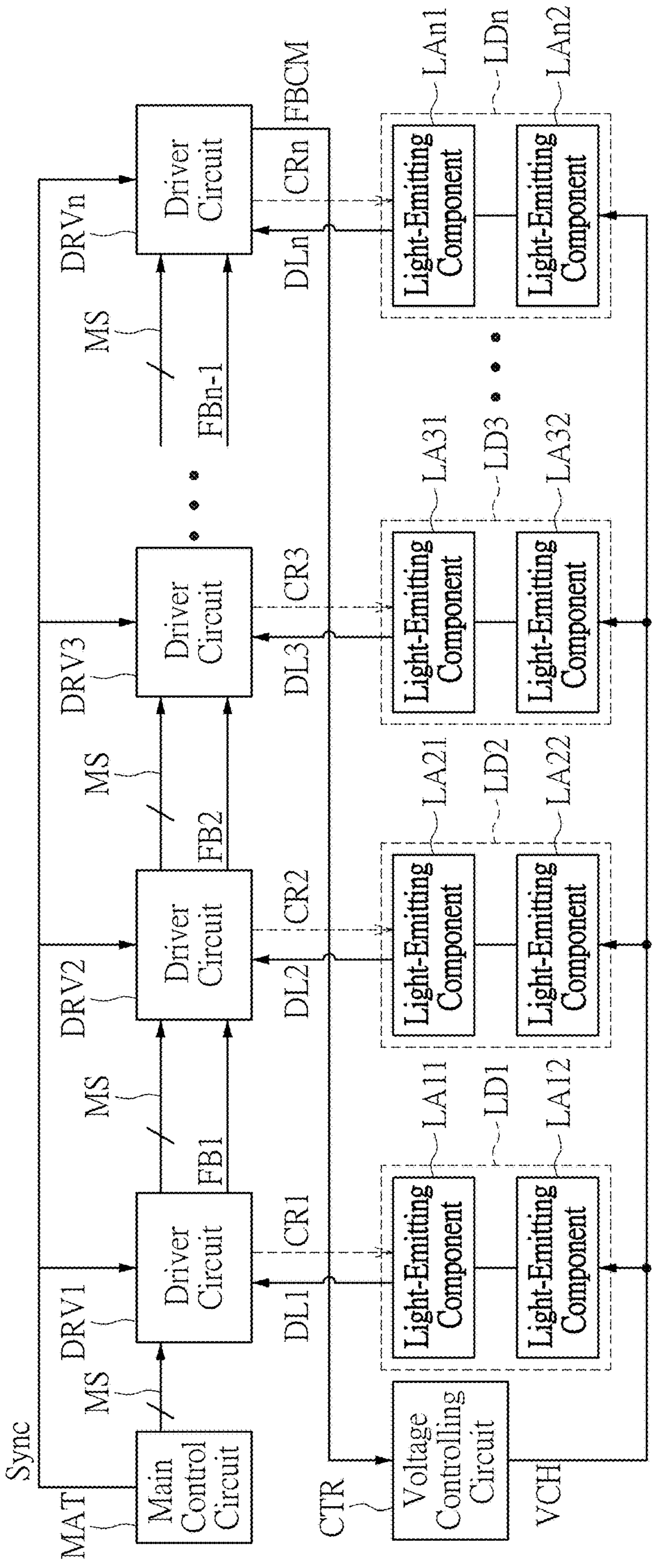
FIG. 3 is a block diagram of an adaptive voltage modulation circuit according to a third embodiment of the present disclosure.

Reference is made to FIG. 3, which is a block diagram of an adaptive voltage modulation circuit according to a third embodiment of the present disclosure.

As shown in FIG. 3, in the third embodiment, the adaptive voltage modulation circuit of the present disclosure not only includes the plurality of driver circuits DRV1 to DRVn and the voltage controlling circuit CTR, but also includes a main control circuit MAT.

The descriptions of the third embodiment of the present disclosure that are the same as the descriptions of the first and second embodiments of the present disclosure are not repeated herein. Differences between the third and second embodiments of the present disclosure are described in detail as follows.

The main control circuit MAT has a main control output terminal. The main control output terminal of the main control circuit MAT is connected to the signal input terminal of the driver circuit DRV1 that is the first one of the plurality of driver circuits DRV1 to DRVn. The signal input terminal of each of the plurality of driver circuits DRV2 to DRVn is connected to the signal output terminal of the previous one of the plurality of driver circuits DRV1 to DRVn-1.

Each of the plurality of driver circuits DRV1 to DRVn, except for the driver circuit DRVn that is the last one of the plurality of driver circuits DRV1 to DRVn, has a main control input terminal and a main control output terminal. The main control input terminal of the driver circuit DRV1 receives a main control signal MS from the main control output terminal of the main control circuit MAT. The main control input terminal of each of the plurality of driver circuits DRV1 to DRVn except for the driver circuit DRVn receives the main control signal MS from the previous one of the plurality of driver circuits DRV1 to DRVn. The main control output terminal of each of the plurality of driver circuits DRV1 to DRVn except for the driver circuit DRVn outputs the received main control signal MS to the next one of the plurality of driver circuits DRV1 to DRVn.

That is, the main control signal MS outputted by the main control circuit MAT is transmitted sequentially to the plurality of driver circuits DRV1 to DRVn in an arrangement order of the plurality of driver circuits DRV1 to DRVn. Each of the plurality of driver circuits DRV1 to DRVn operates according to the main control signal MS.

If necessary, the main control circuit MAT may have a synchronization output terminal. The synchronization output terminal of the main control circuit MAT may output a synchronization signal Sync to a synchronization receiving terminal of each of the plurality of driver circuits DRV1 to DRVn for synchronizing a plurality of operational times respectively of the plurality of driver circuits DRV1 to DRVn.

It should be understood that, the number and configurations of output terminals and input terminals of the main control circuit MAT, the plurality of driver circuits DRV1 to DRVn and the voltage controlling circuit CTR are only exemplified above and may be adjusted according to actual requirements, and the present disclosure is not limited thereto.

Figure 4:
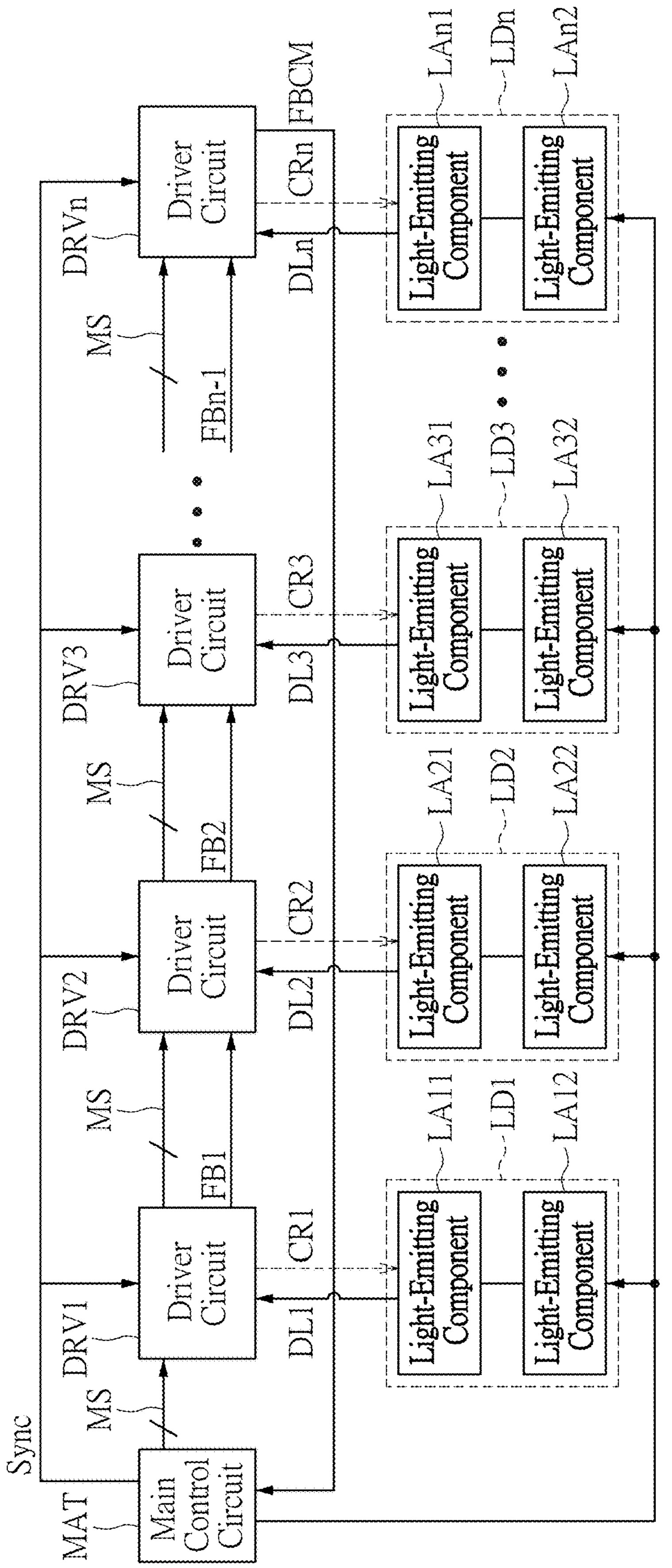
FIG. 4 is a block diagram of an adaptive voltage modulation circuit according to a fourth embodiment of the present disclosure.

Reference is made to FIG. 4, which is a block diagram of an adaptive voltage modulation circuit according to a fourth embodiment of the present disclosure.

As shown in FIG. 4, in the fourth embodiment, the adaptive voltage modulation circuit of the present disclosure only includes the plurality of driver circuits DRV1 to DRVn and the main control circuit MAT, but does not include the voltage controlling circuit CTR as shown in FIG. 3.

The descriptions of the fourth embodiment that are the same as the descriptions of the first to third embodiments are not repeated herein. Differences between the fourth embodiment and the first to third embodiments are described as follows.

The operations that are performed by the voltage controlling circuit CTR shown in FIG. 3 in the third embodiment are performed by the main control circuit MAT in the fourth embodiment.

In the fourth embodiment, the signal output terminal of the driver circuit DRVn that is the last one of the plurality of driver circuits DRV1 to DRVn is connected to the signal input terminal of the main control circuit MAT.

The signal input terminal of the main control circuit MAT receives the power supply instructing signal FBCM from the signal output terminal of the driver circuit DRVn. The main control circuit MAT, according to the power supply instructing signal FBCM from the driver circuit DRVn, outputs the common modulation power signal VCH to each of the plurality of loads LD1 to LDn.

Figure 5:
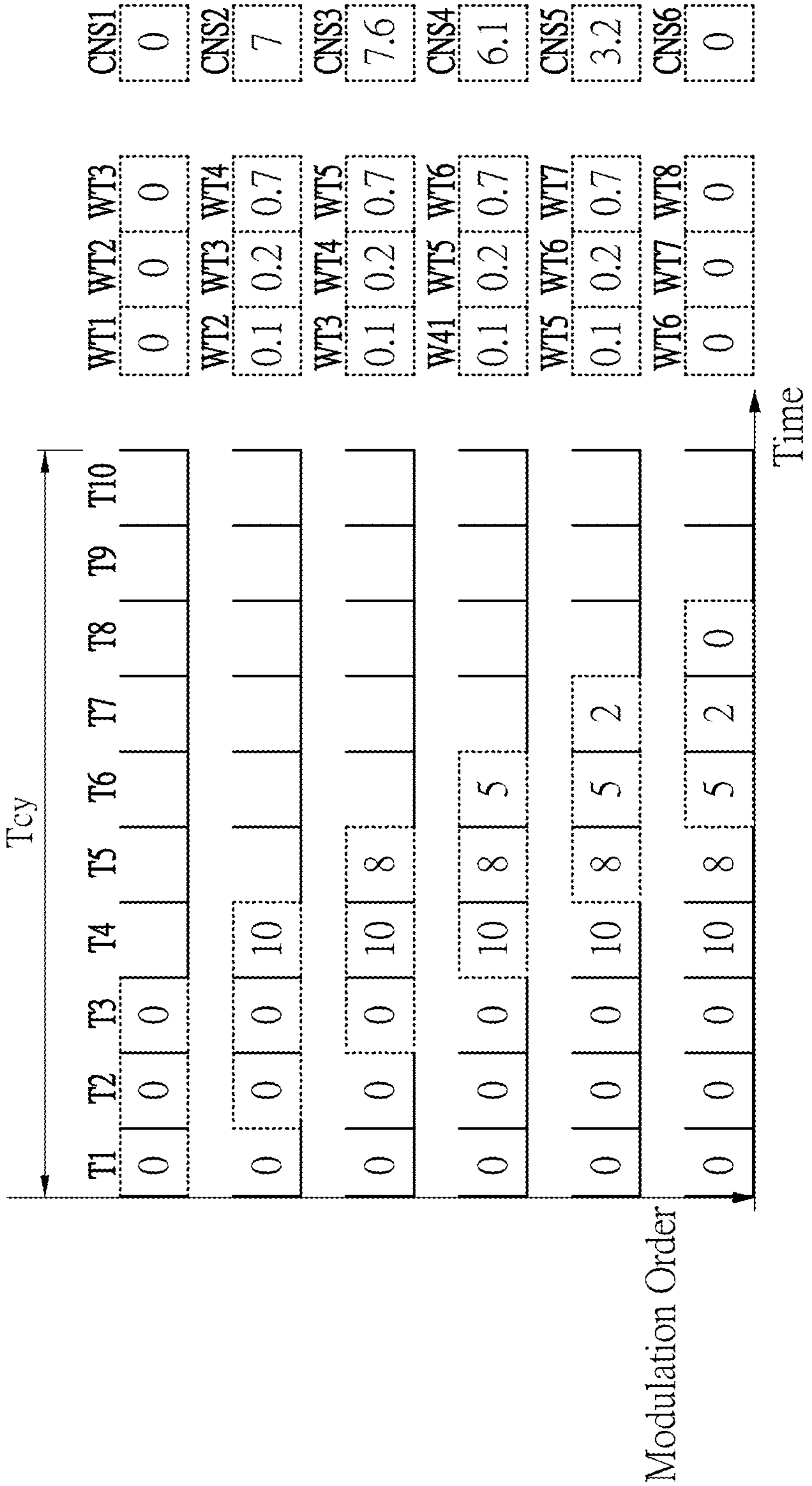
FIG. 5 is a schematic diagram of values calculated by a last one of the plurality of driver circuits included in the adaptive voltage modulation circuit according to a fifth embodiment of the present disclosure.

Reference is made to FIG. 5, which is a schematic diagram of values calculated by a last one of the plurality of driver circuits included in the adaptive voltage modulation circuit according to a fifth embodiment of the present disclosure.

The driver circuit DRVn that is the last one of the plurality of driver circuits DRV1 to DRVn shown in FIG. 1 to FIG. 4 may, according to the data DLn of the load LDn connected thereto and the feedback signal FB1-1 from the driver circuit DRVn-1, count the number of the loads having the voltage being higher than the voltage threshold among the plurality of loads LD1 to LDn within each of a plurality of modulation times. The driver circuit DRVn outputs the power supply instructing signal FBCM according to the numbers that are respectively counted in the plurality of modulation times.

For example, as shown in FIG. 5, within each of ten modulation times T1 to T10 divided from a modulation time interval Tcy, the driver circuit DRVn counts the number of the loads each having the voltage being higher than the voltage threshold among the ten loads LD1 to LD10.

As shown in FIG. 5, within the modulation times T1 to T3, the voltage of each of the ten loads LD1 to LD10 is not higher than the voltage threshold. Therefore, the count value counted within each of the modulation times T1 to T3 is 0.

Then, within the modulation time T4, the voltage of each of the ten loads LD1 to LD10 is higher than the voltage threshold. Therefore, the count value counted within the modulation time T4 is 10.

Then, within the modulation time T5, the voltages of eight ones of the ten loads LD1 to LD10 are higher than the voltage threshold. Therefore, the count value counted within the modulation time T5 is 8.

Then, within the modulation time T6, the voltages of five ones of the ten loads LD1 to LD10 are higher than the voltage threshold. Therefore, the count value counted within the modulation time T6 is 5.

Then, within the modulation time T7, the voltages of two ones of the ten loads LD1 to LD10 are higher than the voltage threshold. Therefore, the count value counted within the modulation time T7 is 2.

Then, within the modulation time T8, the voltage of each of the ten loads LD1 to LD10 is not higher than the voltage threshold. Therefore, the count value counted within the modulation time T8 is 0.

If necessary, the driver circuit DRV1 may set a plurality of weight values respectively for the plurality of count values that are counted respectively within the plurality of modulation times.

For example, the smaller the time difference between the modulation time and a current time point is, the higher the importance of the count value counted within the modulation time is, the larger the weight value is set by the driver circuit DRVn. The larger the time difference between the modulation time and the current time point is, the lower the importance of the count value counted within the modulation time is, and the smaller the weight value set by the driver circuit DRVn is.

The driver circuit DRVn may multiply the plurality of weight value respectively by the plurality of count values that are respectively counted within ones of the plurality of modulation time, to obtain a plurality of arithmetic values. The ones of plurality of modulation time includes the modulation time within which the current time point falls, and the modulation times being earlier than the modulation time within which the current time point falls. The driver circuit DRVn may sum up the plurality of arithmetic values to obtain a total weighted count value.

For example, as shown in FIG. 5, when the current time point enters the modulation time T4, the driver circuit DRVn sets a weight value WT4 of the modulation time T4 to 0.7, a weight value WT3 of the modulation time T3 to 0.2, and a weight value WT2 of the modulation time T2 to 0.1. A difference between the modulation time T4 and the current time point is smaller than a difference between the modulation time T3 and the current time point. Accordingly, the weight value WT4 of the modulation time T4 is larger than the weight value WT3 of the modulation time T3. The difference between the modulation time T3 and the current time point is smaller than a difference between the modulation time T2 and the current time point. Accordingly, the weight value WT3 of the modulation time T3 is larger than the weight value WT2 of the modulation time T2.

When the current time point enters the modulation time T4, the driver circuit DRVn samples the count value “0” counted within the modulation time T4, the count value “10” counted within the modulation time T3 that is earlier than the modulation time T4 and the count value “0” counted within the modulation time T2 that is earlier than the modulation time T3.

Within the modulation time T4, the driver circuit DRVn multiplies the count value “0” counted within the modulation time T2 by the weight value WT2 “0.1” of the modulation time T2 to obtain the arithmetic value “0”.

Within the modulation time T4, the driver circuit DRVn multiplies the count value “0” counted within the modulation time T3 by the weight value WT3 “0.2” of the modulation time T3 to obtain the arithmetic value “0”.

Within the modulation time T4, the driver circuit DRVn multiplies the count value “10” counted within the modulation time T4 by the weight value WT4 “0.7” of the modulation time T4 to obtain the arithmetic value “7”.

Within the modulation time T4, the driver circuit DRVn sums up the arithmetic values “0”, “0” and “7” of the modulation time T4 to obtain a total weighted count value CNS2 “7”, and outputs the common modulation power signal VCH to each of the plurality of loads LD1 to LDn according to the total weighted count value CNS2 “7”.

When the current time point enters the modulation time T5, the driver circuit DRVn samples the count value “8” counted within the modulation time T5, the count value “10” counted within the modulation time T4 that is earlier than the modulation time T5 and the count value “0” counted within the modulation time T3 that is earlier than the modulation time T4.

Within the modulation time T5, the driver circuit DRVn multiplies the count value “0” counted within the modulation time T3 by the weight value WT3 “0.1” of the modulation time T3 to obtain the arithmetic value “0”.

Within the modulation time T5, the driver circuit DRVn multiplies the count value “10” counted within the modulation time T4 by the weight value WT4 “0.2” of the modulation time T4 to obtain the arithmetic value “2”.

Within the modulation time T5, the driver circuit DRVn multiplies the count value “8” counted within the modulation time T5 by the weight value WT5 “0.7” of the modulation time T5 to obtain the arithmetic value “5.6”.

Within the modulation time T5, the driver circuit DRVn sums up the arithmetic values “0”, “2” and “5.6” of the modulation time T5 to obtain a total weighted count value CNS3 “7.6”, and outputs the common modulation power signal VCH to each of the plurality of loads LD1 to LDn according to the total weighted count value CNS3 “7.6”.

When the current time point enters the modulation time T6, the driver circuit DRVn samples the count value “5” counted within the modulation time T6, the count value “8” counted within the modulation time T5 that is earlier than the modulation time T6 and the count value “10” counted within the modulation time T4 that is earlier than the modulation time T5.

Within the modulation time T6, the driver circuit DRVn multiplies the count value “10” counted within the modulation time T4 by the weight value WT4 “0.1” of the modulation time T4 to obtain the arithmetic value “1”.

Within the modulation time T6, the driver circuit DRVn multiplies the count value "8" counted within the modulation time T4 by the weight value WT4 "0.2" of the modulation time T4 to obtain the arithmetic value "1.6".

Within the modulation time T6, the driver circuit DRVn multiplies the count value "5" counted within the modulation time T5 by the weight value WT5 "0.7" of the modulation time T5 to obtain the arithmetic value "3.5".

Within the modulation time T6, the driver circuit DRVn sums up the arithmetic values "1", "1.6" and "3.5" of the modulation time T6 to obtain a total weighted count value CNS4 "6.1", and outputs the common modulation power signal VCH to each of the plurality of loads LD1 to LDn according to the total weighted count value CNS4 "6.1".

When the current time point enters the modulation time T7, the driver circuit DRVn samples the count value "2" counted within the modulation time T7, the count value "5" counted within the modulation time T6 that is earlier than the modulation time T7 and the count value "8" counted within the modulation time T5 that is earlier than the modulation time T6.

Within the modulation time T7, the driver circuit DRVn multiplies the count value "8" counted within the modulation time T5 by the weight value WT5 "0.1" of the modulation time T5 to obtain the arithmetic value "0.8".

Within the modulation time T7, the driver circuit DRVn multiplies the count value "5" counted within the modulation time T6 by the weight value WT6 "0.2" of the modulation time T6 to obtain the arithmetic value "1".

Within the modulation time T7, the driver circuit DRVn multiplies the count value "2" counted within the modulation time T7 by the weight value WT7 "0.7" of the modulation time T7 to obtain the arithmetic value "1.4".

Within the modulation time T7, the driver circuit DRVn sums up the arithmetic values "0.8", "1" and "1.4" of the modulation time T6 to obtain a total weighted count value CNS5 "3.2", and outputs the common modulation power signal VCH to each of the plurality of loads LD1 to LDn according to the total weighted count value CNS5 "3.2".

As described above, the count values counted within the three modulation times are multiplied respectively by the weight values to respectively obtain to the three arithmetic values, and then the three arithmetic values are summed up to calculate the total weighted count value, but the present disclosure is not limited thereto. In practice, the count values may be counted within more or less modulation times and may be sampled for calculation of the total weighted count value.

The driver circuit DRVn that is the last one of the plurality of driver circuits DRV1 to DRVn shown in FIG. 1 to FIG. 4 may calculate the plurality of total weighted count values CNS1 to CNS6 respectively within the modulation time T1 to T6 shown in FIG. 5, and output the power supply instructing signal FBCM according to each of the plurality of total weighted count values CNS1 to CNS6.

It should be understood that, the driver circuit DRVn obtains the three count values in the fifth embodiment, but in practice, the number of the sampled count values may be increased or decreased according to actual requirements.

The power (such as the voltage) of the common modulation power signal VCH outputted to each of the plurality of loads LD1 to LDn is determined according to the total weighted count value. As a result, more appropriate common power is supplied to the plurality of loads LD1 to LDn to synchronously modulate voltages of the plurality of loads LD1 to LDn, such that differences between the voltages respectively of the plurality of loads LD1 to LDn are smaller than a voltage threshold such as a zero value.

In conclusion, the present disclosure provides the adaptive voltage modulation circuit. In the adaptive voltage modulation circuit of the present disclosure, each of the plurality of driver circuits except for the last one of the plurality of driver circuits outputs the feedback signal to the next one of the plurality of driver circuits according to the data (including the voltage) of the load (such as the light string) connected thereto. In particular, the last one of the plurality of driver circuits instructs the voltage controlling circuit to supply an appropriate amount of power to the plurality of loads according to the data of the load connected thereto and the data of others of the plurality of loads driven by other ones of the plurality of driver circuits from the previous one of the plurality of driver circuits. Therefore, the adaptive voltage modulation circuit of the present disclosure is capable of supplying an optimal amount of power to the plurality of loads.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adaptive voltage modulation circuit, comprising:

a plurality of driver circuits that are arranged and connected with each other in series, and that are respectively connected to a plurality of loads; and a voltage controlling circuit connected to the plurality of driver circuits and the plurality of loads;

wherein a first one of the plurality of driver circuits, according to data of the load connected thereto, outputs one of a plurality of feedback signals to a next one of the plurality of driver circuits;

wherein each of the plurality of driver circuits, except for the first one and a last one of the plurality of driver circuits, according to the data of the load connected thereto and a previous one of the plurality of feedback signals from a previous one of the plurality of driver circuits, outputs a next one of the plurality of feedback signals to a next one of the plurality of driver circuits;

wherein the last one of the plurality of driver circuits, according to the data of the load connected thereto and the feedback signal from a previous one of the plurality of driver circuits, outputs a power supply instructing signal;

wherein the voltage controlling circuit, according to the power supply instructing signal, sets a common modulation power signal and outputs the common modulation power signal to each of the plurality of loads.

2. The adaptive voltage modulation circuit according to claim 1, wherein the common modulation power signal includes a voltage signal.

3. The adaptive voltage modulation circuit according to claim 1, wherein a signal input terminal of each of the plurality of driver circuits except for the first one of the plurality of driver circuits is connected to a signal output terminal of the previous one of the plurality of driver circuits, a driving output terminal of each of the plurality of driver circuits is connected to the load, the signal output terminal of the last one of the plurality of driver circuits is connected to a signal input terminal of the voltage controlling circuit, and a power output terminal of the voltage controlling circuit is connected to each of the plurality of loads.

4. The adaptive voltage modulation circuit according to claim 1, wherein each of the plurality of driver circuits compares the data of the load connected thereto with a reference data to generate a comparison result;

wherein the first one of the plurality of driver circuits outputs the one of the plurality of feedback signals to the next one of the plurality of driver circuits according to the comparison result wherein each of the plurality of driver circuits, except for the first one and the last one of the plurality of driver circuits, according to the comparison result and the previous one of the plurality of feedback signals from the previous one of the plurality of driver circuits, outputs the next one of the plurality of feedback signals to the next one of the plurality of driver circuits.

5. The adaptive voltage modulation circuit according to claim 4, wherein the data of each of the plurality of loads includes a voltage, the reference data includes a voltage threshold, and each of the plurality of driver circuits determines whether the voltage of the load connected thereto is higher than the voltage threshold and accordingly sets the feedback signal.

6. The adaptive voltage modulation circuit according to claim 5, wherein the last one of the plurality of driver circuits, according to the data of the load connected thereto and the feedback signal from the previous one of the plurality of driver circuits, counts a number of the loads each having the voltage being higher than the voltage threshold to output the power supply instructing signal.

7. The adaptive voltage modulation circuit according to claim 6, wherein the last one of the plurality of driver circuits counts the number of the loads each having the voltage being higher than the voltage threshold within each of a plurality of modulation times to output the power supply instructing signal.

8. The adaptive voltage modulation circuit according to claim 7, wherein the last one of the plurality of driver circuits multiplies the numbers that are counted within the plurality of modulation times respectively by a plurality of weight values, and outputs the power supply instructing signal according to the numbers that are respectively multiplied by the plurality of weight values.

9. The adaptive voltage modulation circuit according to claim 1, comprising:

a main control circuit connected to the first one of the plurality of driver circuits;

wherein the main control circuit outputs a main control signal to the first one of the plurality of driver circuits, the first one of the plurality of driver circuits transmits the main control signal from the main control circuit to the next one of the plurality of driver circuits, each of the plurality of driver circuits except for the first one and the last one of the plurality of driver circuits transmits the main control signal from the previous one of the plurality of driver circuits to the next one of the plurality of driver circuits, and each of the plurality of driver circuits operates according to the main control signal.

10. The adaptive voltage modulation circuit according to claim 9, wherein the main control circuit outputs a synchronization signal to each of the plurality of driver circuits.

11. The adaptive voltage modulation circuit according to claim 1, wherein one or more of the plurality of driver circuits supplies an individual modulation signal to the load connected thereto according to the data of the load connected thereto.

12. The adaptive voltage modulation circuit according to claim 11, wherein the individual modulation signal includes a current signal.

13. An adaptive voltage modulation circuit, comprising:

a plurality of driver circuits that are arranged and connected with each other in series, and that are respectively connected to a plurality of loads; and a main control circuit connected to the plurality of driver circuits and the plurality of loads;

wherein a first one of the plurality of driver circuits, according to data of the load connected thereto, outputs one of a plurality of feedback signals to a next one of the plurality of driver circuits;

wherein each of the plurality of driver circuits, except for the first one and a last one of the plurality of driver circuits, according to the data of the load connected thereto and a previous one of the plurality of feedback signals from a previous one of the plurality of driver circuits, outputs a next one of the plurality of feedback signals to a next one of the plurality of driver circuits;

wherein the last one of the plurality of driver circuits, according to the data of the load connected thereto and the feedback signal from a previous one of the plurality of driver circuits, outputs a power supply instructing signal;

wherein the main control circuit outputs a main control signal to the first one of the plurality of driver circuits;

wherein each of the plurality of driver circuits, except for the last one of the plurality of driver circuits, transmits the main control signal from the previous one of the plurality of driver circuits to the next one of the plurality of driver circuits;

wherein the main control circuit, according to the power supply instructing signal, outputs a common modulation power signal to each of the plurality of loads.

14. The adaptive voltage modulation circuit according to claim 13, wherein the common modulation power signal includes a voltage signal.

15. The adaptive voltage modulation circuit according to claim 13, wherein each of the plurality of driver circuits compares the data of the load connected thereto with a reference data to generate a comparison result;

wherein the first one of the plurality of driver circuits outputs the one of the plurality of feedback signals to the next one of the plurality of driver circuits according to the comparison result;

wherein each of the plurality of driver circuits, except for the first one and a last one of the plurality of driver circuits, according to the comparison result and the previous one of the plurality of feedback signals from the previous one of the plurality of driver circuits, outputs the next one of the plurality of feedback signals to the next one of the plurality of driver circuits.

16. The adaptive voltage modulation circuit according to claim 15, wherein the data of each of the plurality of loads includes a voltage and the reference data includes a voltage threshold, and each of the plurality of driver circuits determines whether the voltage of the load connected thereto is higher than the voltage threshold and accordingly sets the feedback signal.

17. The adaptive voltage modulation circuit according to claim 16, wherein the last one of the plurality of driver circuits, according to the data of the load connected thereto and the feedback signal from the previous one of the plurality of driver circuits, counts a number of the loads each having the voltage being higher than the voltage threshold to output the power supply instructing signal.

18. The adaptive voltage modulation circuit according to claim 17, wherein the last one of the plurality of driver circuits counts the number of the loads each having the voltage being higher than the voltage threshold within each of a plurality of modulation times to output the power supply instructing signal.

19. The adaptive voltage modulation circuit according to claim 18, wherein the last one of the plurality of driver circuits multiplies the numbers that are counted within the plurality of modulation times respectively by a plurality of weight values, and outputs the power supply instructing signal according to the numbers that are multiplied respectively by the plurality of weight values.

20. The adaptive voltage modulation circuit according to claim 13, wherein one or more of the plurality of driver circuits supplies an individual modulation signal to the load connected thereto according to the data of the load connected thereto.

* * * * *